United States Patent [19]

Brattan

[11] Patent Number: 5,024,788
[45] Date of Patent: * Jun. 18, 1991

[54] STRUCTURE FOR EFFECTING GAS-LIQUID AND PART THEREOF

[75] Inventor: Keith Brattan, Great Boughton, United Kingdom

[73] Assignee: Imperial Chemical Industries PLC, England

[*] Notice: The portion of the term of this patent subsequent to Jun. 4, 2008 has been disclaimed.

[21] Appl. No.: 444,790

[22] Filed: Dec. 1, 1989

[30] Foreign Application Priority Data

Dec. 2, 1988 [GB] United Kingdom ............ 8828221

[51] Int. Cl.$^5$ ............................................. B01F 3/04
[52] U.S. Cl. ............................................. 261/114.1
[58] Field of Search ....................... 261/114.1, 114.3

[56] References Cited

U.S. PATENT DOCUMENTS

| | | | |
|---|---|---|---|
| 1,108,853 | 8/1914 | Sewell | 261/114.1 |
| 2,880,980 | 4/1959 | Bowles | 261/114.1 |
| 3,039,750 | 6/1962 | Kittel | 261/114.1 |
| 3,467,365 | 9/1969 | Webster | 261/114.1 |
| 3,475,134 | 10/1969 | Weber et al. | 261/114.1 |
| 3,914,347 | 10/1975 | Kors | 261/DIG. 39 |
| 3,983,191 | 9/1976 | Schauls | 261/114.1 |
| 4,118,285 | 10/1978 | Yeh | 261/114.1 |
| 4,547,326 | 10/1985 | Weiler | 261/114.1 |

FOREIGN PATENT DOCUMENTS

| | | | |
|---|---|---|---|
| 903447 | 2/1954 | Fed. Rep. of Germany | 261/114.1 |
| 2804680 | 8/1979 | Fed. Rep. of Germany | 261/114.1 |
| 886023 | 10/1943 | France | 261/114.1 |

Primary Examiner—Tim Miles
Attorney, Agent, or Firm—Cushman, Darby & Cushman

[57] ABSTRACT

A substantially planar plate, suitable for use in a structure in which direct contact may be effected between a gas and a liquid, the plate comprising a frame part and at least one bridging part between opposite sides of the frame part, the bridging part dividing the plate into upper and lower cavities bounded by the frame part and the bridging part, and one or more apertures through the bridging part leading from the lower cavity to the upper cavity. The structure comprises one or more such plates and in use of the structure gas will pass upwardly through the structure and liquid downwardly through the structure. The structure has many uses, e.g. in the cooling of electrolytically produced chlorine gas.

22 Claims, 2 Drawing Sheets

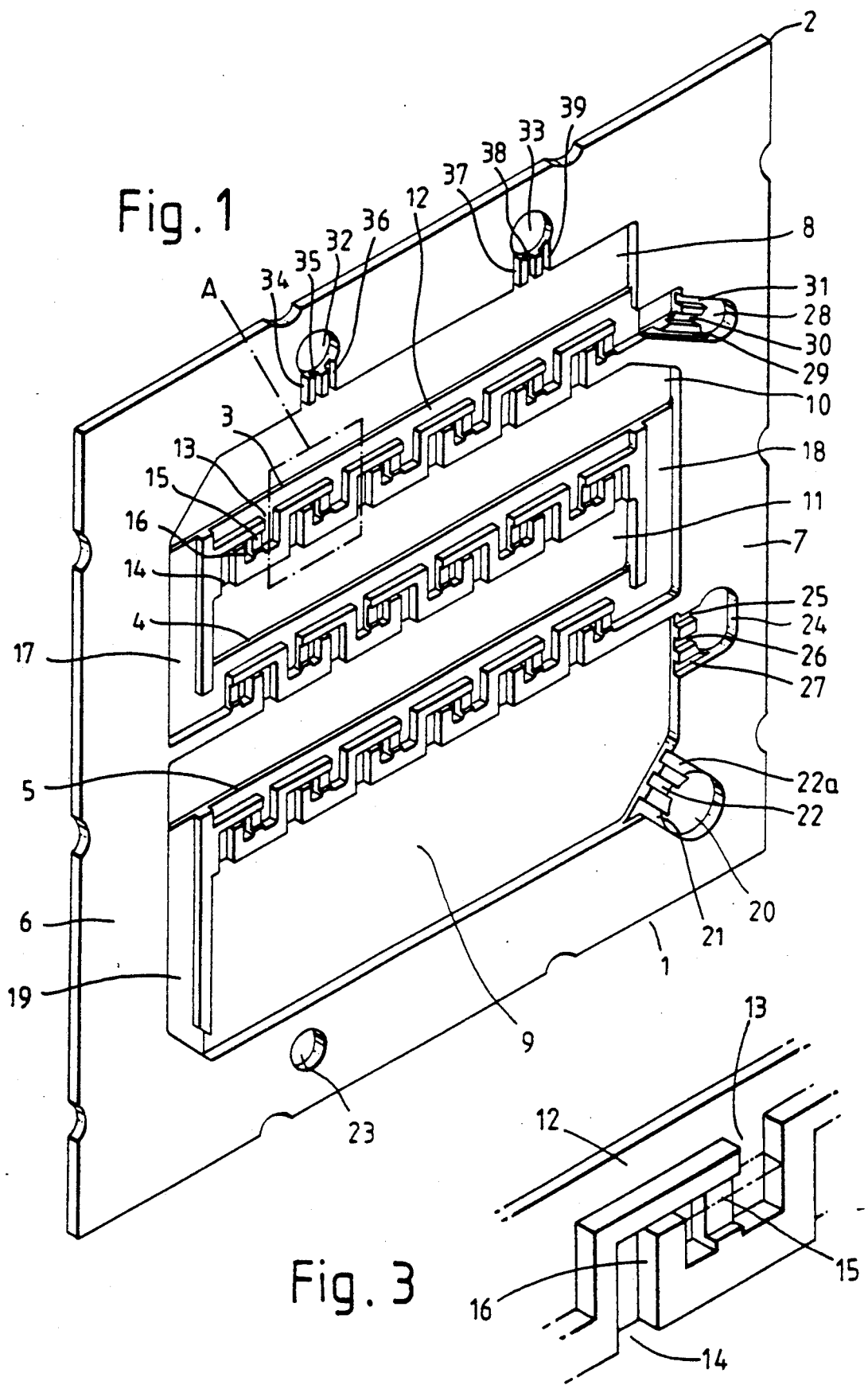

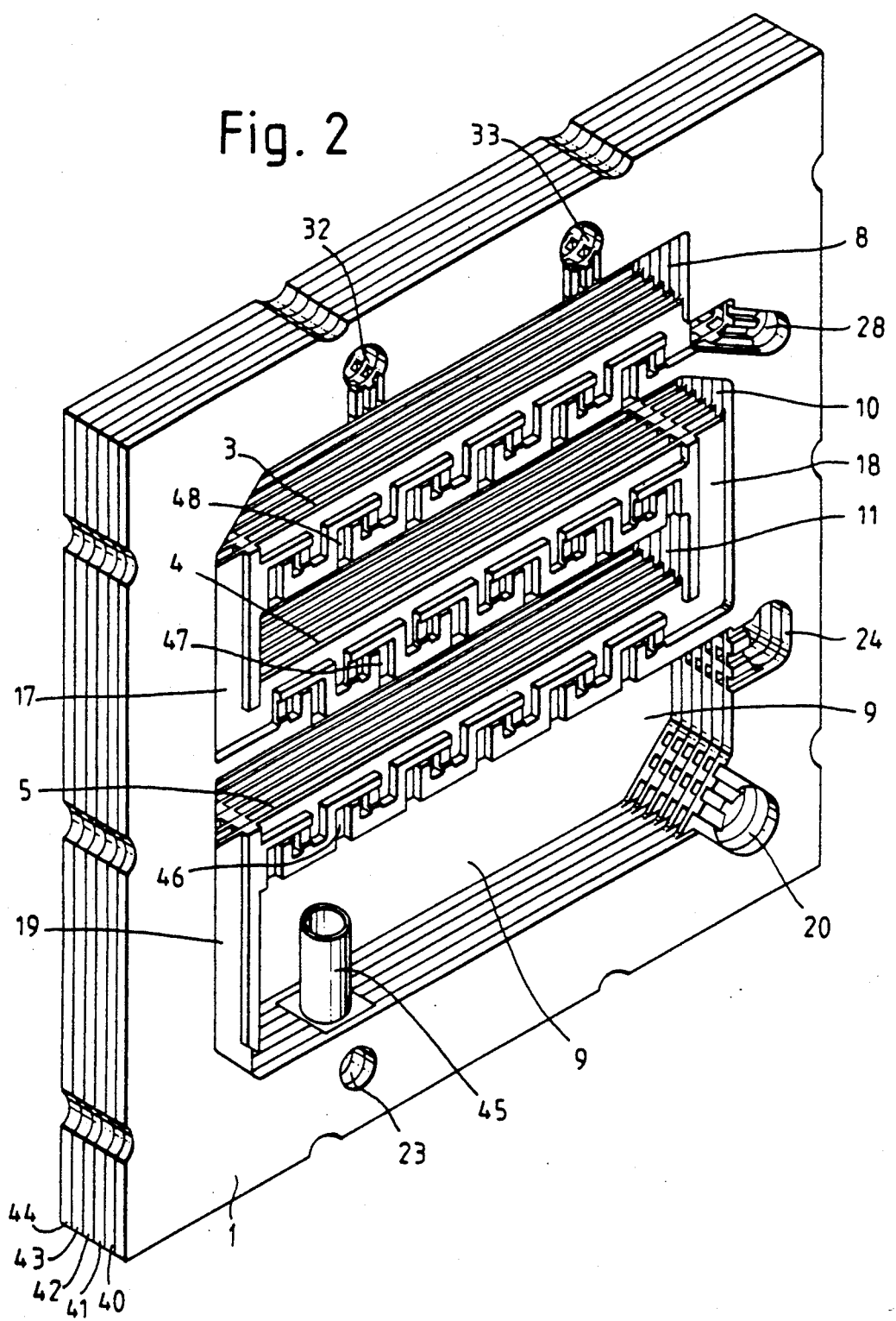

STRUCTURE FOR EFFECTING GAS-LIQUID AND PART THEREOF

This invention relates to a structure in which direct contact may be effected between a gas and a liquid, and more particularly to a part of such a structure.

There are many processes in which directly, or indirectly, contact is effected between a gas and a liquid. For example, a gas may be indirectly contacted with a cooling liquid in a heat-exchanger in order to cool the gas, and similarly a liquid may be cooled in such a heat-exchanger by effecting indirect contact with a cooling gas.

Direct contact may be effected between a liquid and a gas in order, for example, to dry or to cool the gas, or to absorb the gas in the liquid to form a solution therein, or to strip from the liquid a gas which is in admixture with the liquid, or to effect evaporation of the liquid. Such direct contact between a liquid and a gas may be effected in a number of different ways. For example, the gas may be bubbled through a pool of liquid, or streams of the gas and liquid may be contacted in a counter-current manner, for example by passing the liquid downwardly through a column and the gas upwardly through the column. The column may have plates therein, or it may be packed in order to effect intimate contact between the gas and the liquid. Where the column has plates therein the plates may comprise bubble caps positioned over apertures in the plates, or the plates may be in the form of sieve plates.

The present invention relates to a structure which is suitable for use in effecting direct contact between a gas and a liquid, and to a part thereof, which is of simple construction and which is easily assembled and easily maintained.

According to the present invention there is provided a substantially planar plate, suitable for use in a structure comprising one or more substantially planar plates and in which direct contact maybe effected between a gas and a liquid, the plate comprising a frame part and at least one bridging part between opposite sides of the frame part, the bridging part dividing the plate into upper and lower cavities bounded by the frame part and the bridging part, and one or more apertures through the bridging part leading from the lower cavity to the upper cavity.

The invention also provides a structure comprising one or more substantially planar plates as hereinbefore described which structure is equipped with means for feeding liquid to the upper cavity of the planar plate and means for feeding gas to the lower cavity of the planar plate, and with means for removing gas from the upper cavity of the planar plate and with means for removing liquid from the lower cavity of the planar plate.

In operation of the structure gas is fed to the lower cavity of the planar plate and passes upwardly through the aperture or apertures in the bridging part of the plate and contacts liquid which has been fed to the upper cavity of the planar plate, liquid flows to the lower cavity through the apertures or apertures, or by other means to be hereinafter described, and gas and liquid are removed respectively from the upper and lower cavities.

The structure of the invention may comprise one or more and generally a plurality of substantially planar plates as hereinbefore described and optionally one or more and generally a plurality of substantially planar plates of different construction. For example, the latter planar plates of different construction may be in sheet like form and in the structure provide end walls for the upper and lower cavities formed in the planar plates.

The means by which liquid may be fed to and by which gas may be removed from an upper cavity of the planar plate, and the means by which gas may be fed to and liquid may be removed from a lower cavity of the planar plate, may be provided by channels in the frame part of the planar plate. For example, the channels may comprise an aperture through the thickness of the planar plate and a slot or the like substantially at right angles to the aperture and leading from the aperture to an upper or lower cavity within the planar plate. Where the structure of the invention comprises a plurality of substantially planar plates the apertures through the thickness of the plates together may form compartments lengthwise of the structure. The planar plates may comprise a plurality of such apertures in the frame part thereof thereby forming in the structure a plurality of lengthwise compartments through which gas may be fed to and gas may be removed from the structure and through which liquid may be fed to and liquid may be removed from the structure. Not all of the substantially planar plates in the structure need to have slots or the like in the frame parts thereof substantially at right angles to the apertures through the frame parts. For example, the slots or the like may be present only in those substantially planar plates of the structure which have a bridging part, or even in some only of these plates, or alternatively, the slots or the like may be present only in those substantially planar plates of different construction, provided that the slots or the like are so positioned as to provide channels through which gas and liquid may be fed to and removed from the cavities formed within the substantially planar plates.

The substantially planar plate of the invention may comprise a plurality of bridging parts. In this embodiment of the invention the bridging parts divide the plate into a top cavity bounded by the top bridging part and the frame part, a bottom cavity bounded by the bottom bridging part and the frame part, and one or more intermediate cavities bounded by the frame parts and by the bridging parts. In use of a structure which comprises a planar plate having a plurality of bridging parts gas passes upwardly through apertures in the bridging parts and liquid passes downwardly through the apertures, or by other means, and the gas directly contacts the liquid in the intermediate cavity or cavities and in the top cavity of the planar plate. This embodiment of the substantially planar plate of the invention is thus preferred as there is greater contact between the gas and the liquid within the bounds of a given substantially planar plate.

In a preferred embodiment of the substantially planar plate of the invention the use of which leads to improved efficiency of contact between a gas and a liquid in the structure of the invention, the upper part of the bridging part of the plate comprises an open channel along the length of the bridging part, the apertures through the bridging part leading from the lower part of the bridging part to the open channel in the upper part of the bridging part. In use the channel contains the liquid which is to be contacted with the gas and ensures more efficient contact between the gas and the liquid.

The channel may be formed by a groove along the upper part of the bridging part. Alternatively, an upper part of the bridging part may have a groove in a face of the bridging part along the length of the bridging part so that a channel is formed in the bridging part when the bridging part of the substantially planar plate is positioned adjacent to another plate in the structure of the invention, for example, when a bridging part having a groove in a face of the bridging part along the length of the bridging parts abuts against the bridging of an adjacent plate of the same structure, or a plate of different construction, in the structure of the invention.

The apertures in the bridging part of the planar plate leading from a lower cavity of the planar plate to an upper cavity may be channels formed in the bridging part. Alternatively, the bridging part may comprise slots in a face thereof such that in the structure of the invention, when the slotted bridging part of a planar plate abuts against the bridging part of an adjacent plate, or against a plate of different construction, apertures are formed through the bridging part.

In a preferred embodiment of the structure of the invention the dimensions of the apertures in the bridging part of the substantially planar plate are such that in operation of the structure gas passes upwardly through the apertures but little or no liquid passes downwardly through the apertures. In this way liquid tends to be held in an upper cavity in the planer plate and improved contact is effected between the gas and the liquid in the structure. This effect of improved contact may be achieved by suitable choice of the dimensions, and particularly of the cross-section of, the apertures in the bridging part, for example by having a constriction in the bridging part. However, it may be found that by use of an aperture or apertures of such simple construction the desired effect of having little or no liquid flowing downwardly through the apertures in the bridging part may be achieveable only over a narrow range of gas flow rates. At low gas flow rates outside the narrow range the liquid may flow downwardly through the apertures, and at high gas flow rates the gas may pass so rapidly into the upper cavity of the plate that there is only poor contact between the gas and the liquid.

In a preferred embodiment of the planar plate of the invention which, when used in a structure of the invention, results in improved contact between the gas and the liquid and little or no downward flow, of liquid through the apertures in the bridging parts of the plate even over a substantial range of rates of gas flow the apertures in the bridging part of the planar plate are so shaped as to provide a barrier in the form of a weir over which liquid must pass if it is to flow downwardly through the aperture. The barrier may be provided by part of the aperture having a U-shape or an inverted U-shape which in operation of the structure provides a trap for the liquid.

In operation of this preferred embodiment of the invention gases passes upwardly through the apertures in the bridging parts of the planar plates and little or no liquid passes downwardly through the apertures. However, as liquid must be able to pass downwardly from an upper cavity in the planar plate to a lower cavity in the planar plate means which permit this downward passage of liquid must be provided. This latter means may be provided by a channel or downcomer between an upper and lower cavity having a cross-section which will in general be greater than the cross-section of the apertures in the bridging part through which gas passes in use. The latter channel or downcomer for passage of liquid may suitably be provided in a frame part of the substantially planar plate.

The channel or downcomer for passage of liquid may be formed by means of a channel within a frame part of the substantially planar frame, but in preferred embodiment, which is readily constructed, the channel or downcomer is formed by a groove in the face of a frame part which groove is formed into a channel or downcomer in the frame part when the planar plate abuts against an adjacent planar plate, or against a plate of different construction, in the structure of the invention.

It is preferred that the substantially planar plate of the invention is completely planar as this aids in assembly of the planar plates into the structure of the invention and in particular aids in the production of a structure which is free of leaks between adjacent plates in the structure.

The planar plate of the invention may have any suitable shape. For example it may be circular in shape, but it is conveniently rectangular in shape, eg of square shape. Where the planar plate is rectangular in shape the bridging parts of the planar plate are positioned between and bridge opposite vertical sides of the planar plate.

In the planar plate the bridging parts are preferably substantially horizontal.

The planar plate of the invention may be constructed by any convenient means, but the chosen means of construction will depend at least to some extent on the nature of the material from which the plate is constructed. Thus, where the plate is constructed of a plastics material the plate may be moulded by plastics processing techniques, eg by injection moulding or by compression moulding in a suitably shaped mould. On the other hand the plate may be constructed by machining of a sheet. Machining is a suitable construction technique to use where the material of the plate is a plastics material and where the sheet is of a non-plastics material. For example, a planar sheet may be machined in order to form in the sheet a frame part and one or more bridging parts positioned between opposite sides of the frame part, and grooves may be formed in the bridging parts and optionally in the frame parts by machining in order to form apertures in the bridging part for passage of gas from a lower to an upper cavity and an optional channel or channels in the frame part for passage of liquid from an upper to a lower cavity.

The material of construction of the planar plate of the invention will be determined inter alia by the gas and liquid with which the plate is to come into contact during use of the structure of the invention. For reasons of ease of construction, and of ease of assembly into the structure, it is preferred that the plate be of a plastics material. The plastics material may be, for example, a polyolefin, eg polyethylene or polypropylene; a halogen-containing olefine polymer, eg polyvinyl chloride or polyvinylidene chloride; an acrylic polymer, eg, polymethyl methacrylate; a polyester, eg polyethylene terephthalate; an acrylonitrile-butadiene-styrene polymer; or a fluorine-containing polymer, eg poly vinylidene fluoride, particularly where resistance to corrosion by the gas and liquid is required. These plastics materials are disclosed merely by way of example and the planar plate of the invention may be constructed of other plastics materials. A preferred plastics material which is resistant to corrosion by a variety of different gases and liquids is a chlorinated polyvinyl chloride.

The material of construction of the planar plate is not necessarily a plastics material. For example it may be a metallic material, eg steel, although use of such a material is not preferred as such a material is generally less easily shaped than is a plastics material.

The structure of the invention may comprise a plurality of planar plates of the invention. In the structure a plurality of planar plates may be positioned adjacent to each other, and the structure may also comprise planar plates of different construction, eg planar plates in the form of a sheet, which may be positioned between adjacent planar plates of the invention or may be positioned at the ends of the structure to form end plates for the structure.

The structure of the invention will comprise end plates, which may be in the form of sheets, and the structure will comprise means for feeding a gas and liquid to the structure and for removing a gas and liquid from the structure, for example, to and from the lengthwise compartments formed by apertures through frame parts of the planar plates hereinbefore referred to.

The planar plates may be assembled into the structure of the invention by any convenient means. For example, the plates may be positioned on tie rods, via suitable apertures in the plates, eg in the frame parts thereof, and the plates may be compressed on the tie rods. However, a preferred method of assembly is to bond together adjacent planar plates in the structure as a structure assembled in this way will tend to be less prone to gas and liquid leakage than a structure which is assembled merely by compressing plates together. Indeed such a structure assembled by bonding together of adjacent planar plates may be made substantially free of leakages by both gases and liquids without the need to use compressible gasketting materials which may be needed to ensure reasonable freedom from leaks in a structure assembled by compressing plates together. The bonding method to be used will depend on the material of construction of the planar plates. For example, although an adhesive may be used with most materials, be the material a plastics material, a metal, or indeed another type of material, provided the adhesive which is selected is suitable for use with the particular material, solvent bonding and heat welding, which are suitable for use with most plastics materials, will generally be unsuitable for use with metallic materials.

The structure of the invention in which direct contact is effected between a gas and a liquid may be used in many specific applications, some of which have already been referred to in this specification. The structure of the invention is particularly suitable for use in the treatment of chlorine gas or hydrogen gas produced by the electrolysis of an aqueous alkali metal chloride solution in an electrolytic cell. The treatment may be, for example, purification or drying of the chlorine or hydrogen gas, although the structure may be used to effect direct contact between many different gases and liquids.

The structure of the invention may be associated with an electrolytic cell, and, where the electrolytic cell is of the filter press type formed of a plurality of plates, the structure is such that it may conveniently be attached directly to such an electrolytic cell.

BRIEF DESCRIPTION OF THE DRAWINGS

FIG. 1 is an isometric view of a substantially planar plate of the invention;

FIG. 2 is an isometric view of a part of a structure of the invention which comprises a plurality of substantially planar plates; and FIG. 3 shows an enlarged view of that part of the planar plate of FIG. 1 indicated by the letter A.

DETAILED DESCRIPTION OF THE PRESENTLY PREFERRED EXEMPLARY EMBODIMENT

Referring to FIG. 1, and also to FIG. 3, the planar plate 1 comprises a frame part 2 and three substantially horizontal bridging parts 3, 4 and 5 positioned between opposite vertical sides 6 and 7 of the frame part 2. The bridging parts 3, 4, 5 divide the planar plate into an upper cavity 8, a lower cavity 9 and two intermediate cavities 10 and 11. Each of the bridging parts 3, 4, 5 are of similar construction and one of the bridging parts only will be described in detail.

The bridging part 3 comprises a groove 12 in a face of the bridging part along the length of the upper part of the bridging part, and six apertures leading from the lower part to the upper part of the bridging part. One only of these apertures, which is shown in greater detail in FIG. 3, will be described. Each of the apertures is formed by a groove in the face of the bridging part and each groove comprises an opening 13 in the upper part of the bridging part, an opening 14 in the lower part of the bridging part, and a connecting part 15 between the openings 13, 14. The aperture also features a weir 16 the top of which is positioned at a level higher than that of the base of the connecting part 15 and over which liquid must pass in use if it is to flow through the aperture from the upper cavity 8 to the intermediate cavity 10. The height and width of the connecting part 15 may be varied to achieve in use a designed gas pressure drop between the intermediate cavity 10 and the upper cavity 8. The maximum height of liquid within connecting part 15 during operation is shown in phantom lines in FIG. 3. The planar plate 1 also comprises a vertical groove 17 in a face of the plate in the vertical side 6 of the plate which groove leads from the upper cavity 8 to the intermediate cavity 10. The planar plate 1 comprises similar vertical grooves 18, 19 in the vertical sides 7 and 6 respectively of the plate which grooves lead respectively from the intermediate cavity 10 to the intermediate cavity 11 and from the intermediate cavity 11 to the lower cavity 9.

The planar plate comprises an aperture 20 through a frame part of the plate 1 and three slots 21, 22 and 22a in a face of the plate and at right angles to the aperture 20 and leading from the aperture 20 to the lower cavity 9. The planar plate 1 also comprises an aperture 23 through a frame part of the plate 1. The planar plate 1 comprises an aperture 24 through a frame part of the plate 1 and three slots 25, 26, 27 in a face of the plate and at right angles to the aperture 24 and leading from the aperture 24 to the lower cavity 9.

The planar plate comprises an aperture 28 through a frame part of the plate 1 and three slots 29, 30, 31 in a face of the plate and at right angles to the aperture 28 and leading from the aperture 28 to the upper cavity 8. The planar plate also comprises two apertures 32, 33 through a frame part of the plate and three slots 34, 35, 36 and three slots 37, 38, 39 in a face of the plate and at right angles to the apertures 32 and 33 and leading respectively from the apertures 32 and 33 to the upper cavity 8.

Referring now to the embodiment shown in FIG. 2 the structure of the invention comprises a plurality of planar plates 1, 40, 41, 42, 43, 44 each of the plates 40, 41, 42, 43, 44 having a construction which is essentially the same as that of planar plate 1 and differing in one respect only from that of plate 1, as will be explained hereafter. The same reference numerals indicated on FIG. 1 apply to the embodiment of FIG. 2 but for the sake of clarity some only of these reference numerals are shown in FIG. 2.

The plates in the structure of FIG. 2 are bonded together by means of an adhesive, and the structure comprises a stand pipe 45 which is positioned in suitably shaped slots in the plates 41, 42, 43, the stand pipe 45 leading from the lower cavity 9 to the aperture 23 in the plate 1 and similar apertures in the plates 40, 41, 42, 43, 44. It is in respect of this latter slot only in the plates 41, 42, 43 that these latter plates differ from the plate 1. In the structure the apertures 20, 23, 24, 28, 32, 33 in the plate 1 and similar apertures in the plates 40, 41, 42, 43, 44 together provide six separate compartments lengthwise of the structures. The structure of the invention is completed by end plates which for the sake of clarity have not been shown and which provide end walls for the structure and in particular for the cavities 8, 9, 10, 11.

It will be appreciated that in the assembled structure the positioning together of like planar plates 1, 40, 41, 42, 43, 44 converts the groove 12 in the upper part of the bridging part 3 of the planar plate 1 into a channel, and that the upper parts of the bridging parts in the planar plates are thus formed in the structure into a plurality of such channels. Similarly, the positioning together of like planar plates converts the grooves in the faces of the bridging part having openings 13, 14 and connecting part 15 into channels leading from a lower part of the bridging part to an upper part of the bridging part, and the grooves 17, 18, 19 are similarly formed into channels or downcomers leading from an upper cavity of the structure to intermediate or lower cavities of the structure.

Operation of the structure of the invention will now be described with particular reference to FIG. 2 and with reference to the cooling of gaseous chlorine which has been produced by the electrolysis of aqueous sodium chloride solution, although it is to be understood that this particular use is given merely by way of example. In order to aid the description the apertures in bridging part 5 between a lower and upper part thereof will be given reference numeral 46, the apertures in bridging parts 4 between a lower part and an upper part thereof will be given reference numeral 47, and the apertures in bridging parts 3 between a lower part and an upper part thereof will be given reference numeral 48.

The electrolytic cell, which is not shown, is of the filter press type and comprises a plurality of anodes and plurality of cathodes each anode being separated from an adjacent cathode by a cation-exchange membrane thereby dividing the cell into a plurality of anode compartments and a plurality of cathode compartments. Suitable constructions of such anodes and cathodes, and materials therefore, and suitable caton-exchange membranes, are well-known in the art. In the electrolysis aqueous alkali metal chloride solution is charged to the anode compartments and water or dilute aqueous sodium hydroxide solution is charged to the cathode compartments, the sodium chloride is electrolysed and hot chlorine and hot depleted aqueous sodium chloride solution are discharged from the anode compartments, the sodium ions liberated in the electrolysis are transferred by the cation-exchange membranes from the anode compartments to the cathode compartments of the cell in which they react with water to form sodium hydroxide solution and hydrogen, and hot hydrogen and hot aqueous sodium hydroxide solution are discharged from the cathode compartments of the cell.

Hot chlorine discharged from the anode compartments of the electrolytic cell is charged to the lengthwise compartment of which aperture 24 forms a part and thence through the associated slots 25, 26, 27 into lower cavity 9 of the structure.

The chlorine gas then passes progressively upwards through the structure via apertures 46 in bridging part 5 and into intermediate cavity 11, via apertures 47 in bridging part 4 and into intermediate cavity 10, and finally via apertures 48 in bridging part 3 and into upper cavity 8.

Chilled aqueous sodium chloride solution from a reservoir thereof is charged to the lengthwise compartment of which aperture 28 forms a part and thence through associated slots 29, 30, 31 into upper cavity 8 of the structure. In the upper cavity the chilled solution fills the channels on the upper part of the bridging parts 3 formed by grooves 12, the solution passes through the channel formed by vertical groove 17 and into intermediate cavity 10 and fills the channels on the upper part of the bridging parts 4 formed by grooves 12, the solution then passes through the channel formed by vertical groove 18 and into intermediate cavity 11 and fills the channels on the upper part of the bridging part 5 formed by grooves 12, and finally the solution passes through the channel formed by vertical groove 19 and into lower cavity 9.

In operation of the structure of the invention the chlorine gas which passes upwardly through the structure through the apertures 46, 47, 48 in the bridging parts 5, 4, 3 respectively contacts the chilled aqueous sodium chloride solution in the cavities 11, 10, 8, particularly the solution in the channels on the upper parts of the bridging parts 3, 4, 5. The chlorine gas which passes to upper cavity 8 is cooled and is removed from cavity 8 via the lengthwise compartments of which apertures 32 and 33 form a part. The aqueous sodium chloride solution passes downwardly through channels 17, 18, 19 from upper cavity 8 to lower cavity 9 and the solution is progressively heated by contact with the chlorine gas. The tendency of aqueous sodium chloride solution to flow downwardly through apertures 48, 47, 46 on bridging parts 3, 4, 5 respectively is resisted by the presence of the weir 15 in each of the apertures.

Hot aqueous sodium chloride solution which has been discharged from the electrolytic cell is also charged to lower cavity 9 through the lengthwise compartment of which aperture 20 forms a part and the associated slots. In cavity 9 the hot aqueous sodium chloride solution discharged from the electrolytic cell is mixed with the aqueous sodium chloride solution which has been contacted with the chlorine and the mixed solutions are discharged from the structure through stand pipe 45 and the lengthwise compartment of which aperture 23 forms a part. The mixed solution is then charged to the anode compartments of the electrolytic cell for electrolysis, possibly after further purification and/or resaturation with sodium chloride.

I claim:

1. A substantially planar plate, suitable for use in a structure comprising one or more substantially planar plates and in which direct contact may be effected between a gas and a liquid, the said plate comprising a frame part and at least one bridging part between opposite sides of the frame part, the bridging part dividing the plate into upper and lower cavities bounded by the frame part and the bridging part, and one or more apertures through the bridging part leading from the lower cavity to the upper cavity.

2. A substantially planar plate as claimed in claim 1 which comprises a plurality of bridging parts which divide the plate into a top cavity bounded by a top bridging part and the frame part, a bottom cavity bounded by the bottom bridging part and the frame part, and one or more intermediate cavities bounded by the frame parts and by the bridging parts.

3. A substantially planar plate as claimed in claim 1 or claim 2 in which the bridging part has an upper part which comprises an open channel along the length of the bridging part.

4. A substantially planar plate as claimed in claim 3 in which the channel is formed by a groove along the upper part of the bridging part.

5. A substantially planar plate as claimed in claim 4 in which a groove is formed in a face of the bridging part along the length of the bridging part so that a channel is formed in the bridging part when the bridging part of the substantially planar plate is positioned adjacent to another plate in the structure of the invention.

6. A substantially planar plate as claimed in claim 5 in which the apertures through the bridging parts of the planar plate are provided by channels formed in the bridging parts.

7. A substantially planar plate as claimed in claim 5 in which the bridging parts comprise slots in a face thereof such that in the structure of the invention, when the bridging part of a planar plate abuts against the bridging part of an adjacent plate, apertures are formed through the bridging part.

8. A substantially planar plate as claimed in claim 7 in which the dimensions of the apertures in the bridging parts of the substantially planar plate are such that in operation of the structure gas passes upwardly through the apertures but little or no liquid passes downwardly through the apertures.

9. A substantially planar plate as claimed in claim 8 in which the apertures in the bridging part of the planar plate are so shaped as to provide a barrier in the form of a weir over which in use liquid must pass if it is to flow downwardly through the aperture.

10. A substantially planar plate as claimed in claim 9 in which the channels have a U-shape or an inverted U-shape.

11. A substantially planar plate as claimed in claim 1 in which the plate is provided with a channel or downcomer between an upper cavity and a lower cavity and through which downward flow of liquid may take place.

12. A substantially planar plate as claimed in claim 11 in which the channel or downcomer is provided in a frame part of the plate.

13. A substantially planar plate as claimed in claim 12 in which the channel or downcomer is formed by a groove in the face of a frame part of the plate which groove is formed into a channel or downcomer in the frame part when the planar plate abuts against an adjacent planar plate.

14. A substantially planar plate as claimed in claim 1 which is rectangular in shape.

15. A substantially planar plate as claimed in claim 1 in which the bridging parts are substantially horizontal.

16. A structure in which direct contact may be effected between a gas and a liquid and which comprises one or more substantially planar plates as claimed in claim 1 and which is equipped with means for feeding liquid to an upper cavity of the planar plate and means for feeding gas to a lower cavity of the planar plate, and with means for removing gas from an upper cavity of the planar plate and with means for removing liquid from a lower cavity of the planar plate.

17. A structure as claimed in claim 16 in which the means by which liquid may be fed to and by which gas may be removed from an upper cavity of the planar plate, and the means by which gas may be fed to and liquid may be removed from a lower cavity of the planar plate, are provided by channels in the frame part of the planar plate.

18. A structure as claimed in claim 17 in which the channel comprises an aperture through the thickness of the planar plate and a slot or the like substantially at right angles to aperture and leading from the aperture to an upper or lower cavity of the planar plate.

19. A structure as claimed in claim 18 which comprises a plurality of substantially planar plates and in which the apertures through the thickness of the plates together form compartments lengthwise of the structure.

20. A structure as claimed in claim 19 in which the planar plates may comprise a plurality of such apertures in the frame part thereof thereby forming in the structure a plurality of lengthwise compartments through which gas may be fed to and gas may be removed from the structure and through which liquid may be fed to and liquid may be removed from the structure.

21. A structure as claimed in claim 16 which comprises one or more further substantially planar plates having a construction different from that of said substantially planar plates.

22. A structure as claimed in claim 21 in which the further substantially planar plates of different construction form end plates for the structure.

* * * * *